United States Patent [19]

Sumitani et al.

[11] Patent Number: 5,323,844
[45] Date of Patent: Jun. 28, 1994

[54] REFRIGERANT HEATING TYPE AIR CONDITIONER

[75] Inventors: Shigeto Sumitani; Takeshi Sato; Miki Fujita, all of Fuji, Japan

[73] Assignee: Kabushiki Kaisha Toshiba, Kawasaki, Japan

[21] Appl. No.: 998,294

[22] Filed: Dec. 30, 1992

[30] Foreign Application Priority Data

Mar. 25, 1992 [JP] Japan ............................ 4-067137

[51] Int. Cl.⁵ .............................................. F25B 29/00
[52] U.S. Cl. ..................................... 165/29; 62/238.6; 62/238.7; 237/2 B
[58] Field of Search ........................ 62/238.6, 238.7; 237/2 B; 165/29

[56] References Cited

U.S. PATENT DOCUMENTS

| | | |
|---|---|---|
| 3,188,829 | 6/1965 | Siewert et al. ............. 62/238.6 |
| 4,112,705 | 9/1978 | Sisk et al. .................. 62/238.6 |
| 4,441,901 | 4/1984 | Endoh ....................... 62/238.7 |
| 4,506,521 | 3/1985 | Asano et al. ................ 237/2 B |
| 4,516,408 | 5/1985 | Chiba ........................ 62/238.7 |
| 4,802,529 | 2/1989 | Sumitani et al. ............ 165/29 |
| 4,905,894 | 3/1990 | Noguchi ..................... 237/2 B |
| 5,174,365 | 12/1992 | Noguchi et al. ............ 62/238.7 |

FOREIGN PATENT DOCUMENTS

| | | | |
|---|---|---|---|
| 54-15550 | 2/1979 | Japan . | |
| 0111153 | 4/1989 | Japan .................. | 237/2 B |
| 0061467 | 3/1990 | Japan .................. | 62/238.7 |
| 0171558 | 7/1990 | Japan .................. | 62/238.7 |

Primary Examiner—John K. Ford
Attorney, Agent, or Firm—Cushman, Darby & Cushman

[57] ABSTRACT

A refrigerant heating type air conditioner operable in a cooling mode and a heating mode includes a first external heat exchanger which works as a condenser in the cooling mode and a second external heat-exchanger which works as an evaporator. Bypass means is disposed between a discharge side of a compressor and the second external heat-exchanger. An expansion valve is connected to an inner heat-exchanger, which works as a condenser in the heating mode, and to both the first and second external heat-exchangers. A control valve is disposed between a suction port side of the second external heat-exchanger for preventing the refrigerant from flowing to the second external heat-exchanger in the cooling mode. Pressure of the refrigerant which is trapped between the control valve and the expansion valve is increased by applying heat, by heating means, to the second external heat-exchanger. The heated refrigerant is released to the bypass means when its pressure exceeds to the pressure of discharged refrigerant from the compressor.

15 Claims, 3 Drawing Sheets

REFRIGERANT HEATING TYPE AIR CONDITIONER

BACKGROUND OF THE INVENTION

1. Field of the invention

The present invention relates to a refrigerating apparatus, and more specifically to the improvement of a refrigerant heating type air conditioner.

2. Description of the prior art

A refrigerant heating type of air conditioner is generally known. For example, in U.S. Pat. No. 4,905,894 discloses an air conditioner provided with heater means for heating refrigerant in an external heat-exchanger.

FIG. 1 is a schematic iiiustration of a conventional refrigerant heating type air conditioner. A detailed description of the conventional apparatus forms part of the description of the corresponding features of the preferred embodiments of the present invention, which are identified by the same reference characters in FIGS. 1, 2 and 3. The conventional air conditioner includes heating means employed when an air conditioner operates in a heating mode. A compressor discharges refrigerant to a closed circuit known as a refrigerant circuit. In the heating mode, the refrigerant, which has been condensed in an inner heat-exchanger is supplied to the external heat-exchanger serving as an evaporator through an expansion valve. The refrigerant in the evaporator absorbs heat from the heating means and is vaporized. The vaporized refrigerant then returns to the compressor. A two-way valve is disposed at a suction port side of the compressor and the evaporator that the refrigerant in the heating mode returns to the compressor if the two-way valve is opened. When the air conditioner operates in a cooling mode, the refrigerant discharged from the compressor first flows to another external heat-exchanger or a condenser in which the refrigerant is condensed. The condensed refrigerant is then supplied to the inner heat-excahnger through the expansion valve. The two-way valve prevents the refrigerant flowing through the first external heat-exchanger to the compressor in the cooling mode. A check valve is provided to shutdown the flow of the refrigerant to another heat-exchanger or the condenser in the heating mode.

The air conditioner desoribed above has a disadvantage in that a state may exist in which both the two-way valve is closed for and the expansion valve is closed during the heating mode. In such a state the refrigerant is trapped in the evaporator. The trapped refrigerant is heated and the pressure of the trapped refrigerant will greatly increased thereby damaging various parts of the air conditioner.

SUMMARY OF THE INVENTION

It is an object of the present invention to provide an improved refrigerant heating type air conditioner, which prevents abnormal increase of refrigerant pressure in a refrigerant circuit. A further object of the present invention is to provide a safe refrigerant heating type air conditioner, which substantially releases abnormal pressure of a trapped refrigerant in a refrigerant cicruit.

To accomplish the above objects, there is provided a refrigerant heating type air conditioner operable in a cooling mode and in a heating mode whioh comprises;

an external unit including a compressor for compressing a refrigerant, a refrigerant heating unit including an external heat-exchanger which functions as an evaporator in the heating mode and hearing means for heating the refrigerant of said external heat-exchanger in the heating mode, an inner unit including an inner heat-exchanger which functions a condenser in the heating mode, distributing means for forming a refrigerant carrying loop including said compressor, said inner heat-exchanger, and said external heat-exchangers, wherein the refrigerant flows though said external heat-exchanger and said heat-exchanger in the heating mode, refrigerant flow control means disposed in said distributing mean for controlling the flow of the refrigerant in said heating, said distributing means including a expansion valve disposed between said inner heat-exchanger and said external heat-exchanger, bypassing means disposed between a discharge side of said compressor and one end of said expansion valve for releasing the refrigerant in said external heat-exchanger when the pressure of the refrigerant in said external heat-exchanger becomes higher than the pressure of the discharged refrigerant from said compressor in the heating mode; and operation control means for controlling the operation of said compressor and said refrigerant flow oontrol means, and for generating a signal to stop the operation of said compressor when the pressure of refrigerant in said heat-exchanger exceeds a predetermined pressure.

BRIEF DESCRIPTION OF THE DRAWINGS

The accompanying drawings, which are incorporated in and constitute a part of the specification, illustrate the preferred embodiments of tbe invention.

DETAILED DESCRIPTION OF THE PREFERRED EMBODIMENT

Figure 1:
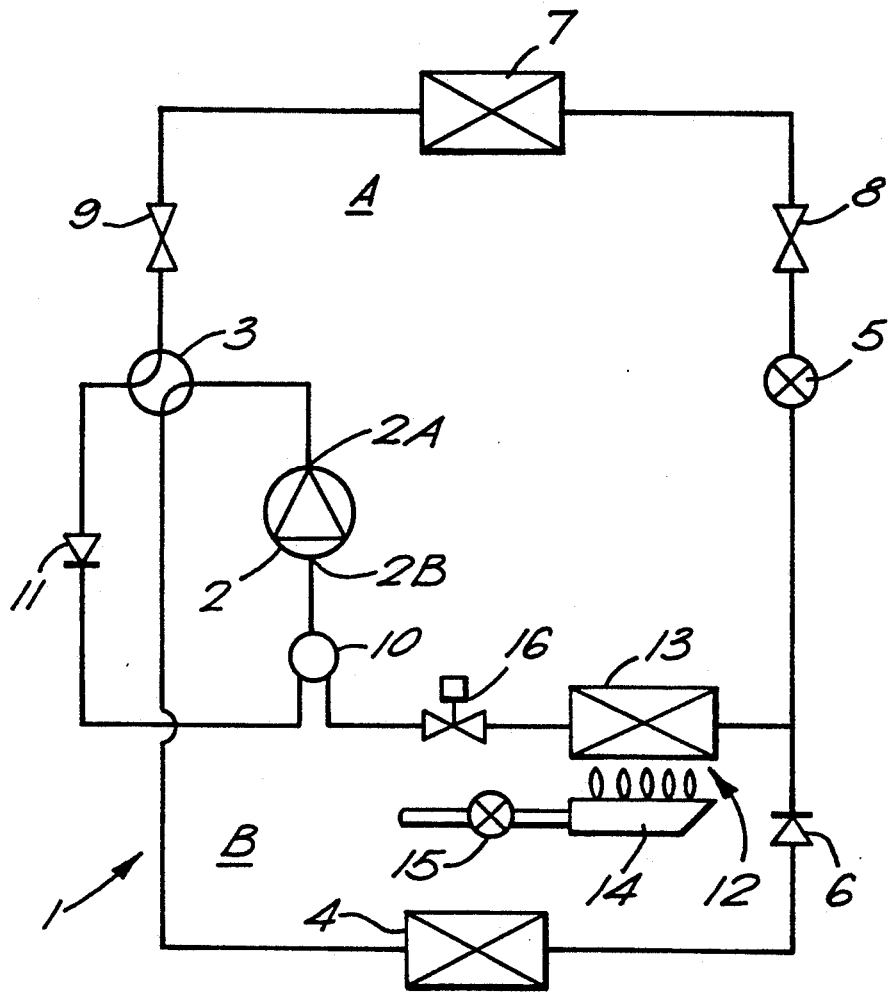
FIG. 1 shows a conventional arrangement of a refrigerant heating type air conditioner.
Figure 2:
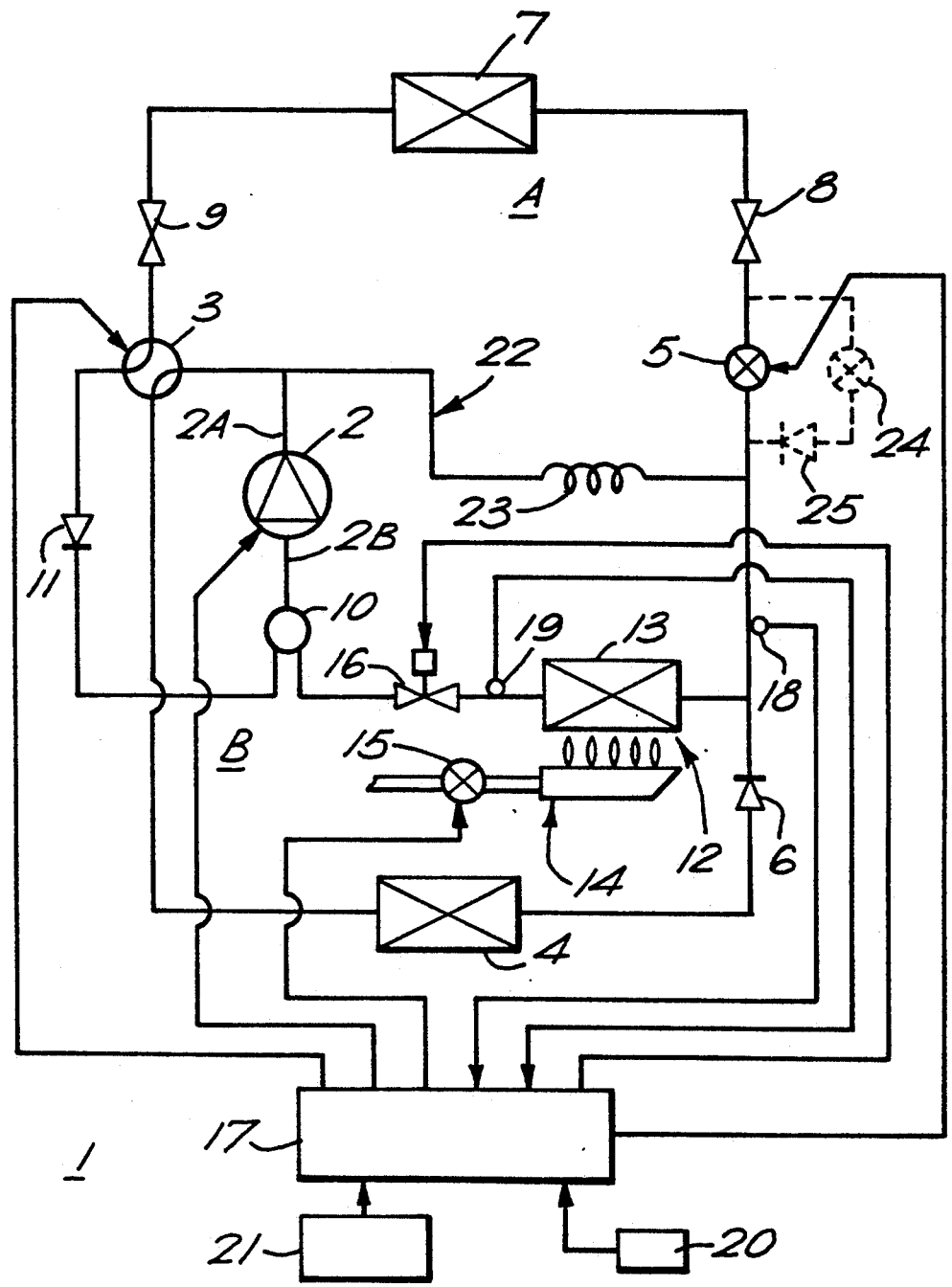
FIG. 2 shows an arrangement of a first embodiment of a refrigerant heating type air conditioner according to the present invention.

The preferred embodiment of the present invention will now be described in more detail with reference to the accompanying drawings. FIG. 2 shows an arrangement of a refrigerant heating type air conditioner as one embodiment of the present invention.

An air conditioner 2 is composed of an internal unit A and an external unit B. Air conditioner 1 has a refrigerant circuit in which a compressor 2 is provided. A capacity of compressor 2 is varied and refrigerant is discharged from a discharge port. The discharge port 2A is connected to a four-way valve 3. Four-way valve 3 changes-over the operation mode of air conditioner 1 to either a cooling mode or a heating mode. The flow of refrigerant is essentially reversed when the mode is changed from one to the other. A first external heat-exchanger 4 which functions as a condenser during the cooling mode is connected to four-way valve 3. In the cooling mode, four-way valve 3 is set to a cooling position where the refrigerant flows to first external heat exchanger 4. First external heat-exchanger 4 is connected to an expansion valve 5. A check valve 6 is connected between first external heat-excahnger 4 and expansion valve 5, which prevents the refrigerant from flowing into first external heat-exchanger 4 during the heating mode. The degree that the expansion valve 5 is opened varies by a pulse motor (not shown), and is called a pulse motor valve (hereinafter called PMV 5). PMV 5 is connected to an inner heat-exchanger 7 via a two-way valve 8. Liquid refrigerant flowing into inner heat-exchanger 7 is evaporated during the cooling mode. Inner heat-exchanger 7 thus functions as an evaporator in the cooling mode.

Inner heat-exchanger 7 is connected to four-way valve 3 via a two-way valve 9. Two-way valves 8 and 9 are connecting valves for connecting piping between internal unit A and external unit B, and each of them needs to be opened before air conditioner 1 can be operated. A suction port 2B of compressor 2 is connected to an accumulator 10. Numeral 11 denotes a check valve. External unit B has a refrigerant heating unit 12 disposed between a connecting point of PMV 5 and check valve 6 and accumulator 10. Refrigerant heating unit 12 includes a second external heat-exchanger 13 and heater means 14. Second heat-exchanger 12 absorbs heat from heater means 14 and vaporizes the refrigerant during the heating mode. Heater means 14 has fuel control means, such as a gas flow rate control valve 15. Numeral 16 denotes a two-way valve connected between second external heat-exchanger 13 and accumulator 10. Two-way valve 16 prevents the refrigerant from flowing into the second external heat-exchanger 13 during the cooling mode. When air conditioner 1 works in the heating mode, four-way valve 3 is selected to the heating position to send the refrigerant from compressor 2 to inner heat-exchanger 7 which now functions as a condenser. A control unit 17, which is composed of a microcomputer and its peripheral circuits, is connected to compressor 2, four-way valve 3, PMV 5, two-way valve 16, gas flow rate control valve 15 and various sensors, such as temperature sensors 18, 19 and 20. Control unit 17 sets an operating position of four-way valve 3 in accordance with the selected operating mode of air conditioner 1. The operating mode or other setting conditions, such as desired room temperature, is set at a controller 21. Temperature sensor 20 detects room temperature. Sensors 18 and 19 disposed at an inlet side of second external heat-exchanger and at the outlet side of the same, respectively, are used to observe the superheat of the refrigerant at second external heat-exchanger 13. The superheat is the difference between the two temperatures detected by sensors 18 and 19, and it is controlled and kept substantially constant by continuously controlling the degree of opening of PMV 5 through control unit 17 in response to the detected two temperatures during the heating mode.

In the cooling mode, PMV 5 is similarly controlled by detecting temperatures of refrigerant both at the discharge port of compressor 2 and the outlet side of first external heat-exchanger 4, however sensors for this purpose are not shown in FIG. 2. Bypass means 22 is provided in the refrigerating circuit, specifically it is connected between the discharge port 2A of compressor 2 and a connection point of PMV 5, second external heat-exchanger 12 and check valve 6. Numeral 23 denotes a capillary tube in bypass means 22. As shown by the dotted line in FIG. 2, a series of an expansion valve 24 and a check valve 25 may be connected in parallel to PMV 5.

The operation of the first embodiment will now be explained.

In the heating mode, four-way valve 3 is set to the heating position, so that the refrigerant enters inner heat-exchanger 7 through two-way valve 9. The refrigerant is so condensed at inner heat-exchanger 7 so that heat is generated. The heat is dissipated to warm a space where inner heat-exchanger 7 is disposed. The refrigerant is then supplied to second external heat-exchanger 13 through two-way valve 8 and PMV 5. Each of two-way valves 8 and 9 must be opened in advance of the operation of air conditioner 1.

When the refrigerant flows into second external heat-exchanger 13, it picks up heat from heater means 14 and is vaporized. The heated refrigerant is returned to compressor 2 through two-way valve 16 and accumulator 10. The degree of the opening of PMV 5 is controlled to maintain the superheat of refrigerant to be substantially constant at second external heat-exchanger 13. A control pulse signal is supplied to PMV 5 and is generated at control unit 16 based on the temperatures detected by sensors 18 and 19. Having disposed bypass means 22, there exists a flow of the refrigerant into bypass means 22 from compressor 2, however the amount of flow is very small due to the resistance of capillary tube 23. Accordingly, no interference with the operation of air conditioner 1 occurs.

Assume now that, during the heating mode, two-way valve 16 has not opened due to a malfunction. In addition to the malfunction, assume that PMV 5 has not opened. In this instance, the refrigerant is trapped between MPV 5 and two-way valve 16. The trapped refrigerant is heated by heater means 14, which results in the increase of pressure of the trapped refrigerant. When the trapped refrigerant pressure becomes higher than that of refrigerant discharged from compressor 2, the trapped refrigerant is released to bypass means 22 and flows into the discharge side 2A of compressor 2. Accordingly, the increase of the pressure of the trapped refrigerant is mitigated. The increase temperature of the trapped refrigerant which causes the pressure increase is observed by sensor 18. When the temperature detected by sensor 18 exceeds a predetermined temperature, the operation of compressor 2 is stopped, and at the same time control valve 16 is closed in order to stop heating second external heat-exhanger 13. In this manner, an abnormal increase of the pressure can be prevented by releasing the refrigerant through bypass means 22 as well as by stopping the operation of compressor 2 and heating means 13 in response to the detection of the trapped refrigerant temperature. Accordingly, any damage to refrigerant heating unit 12 and other parts such as piping connected to refrigerant heating unit 12 can be prevented. It is further advantageous to compose bypass means 22 with inexpensive parts, such as capillary tube 23, instead of using an expensive expansion valve.

Assume now that the opening of two-way valve 8 has been overlooked in the heating mode, such case being likely to occur during the first operation in the heating mode after installation of air conditioner 1. Also assume that two-way valve 16 is not opened by accident. In this instance, the refrigerant will be trapped between the two valves 8 and 16 in the refrigerant circuit. However, the pressure control of the trapped refrigerant is done in the same way as described above with respect to the operation of bypass means 22 and sensor 18.

When two-way valves 9 and 16 are closed, the refrigerant which increases in pressure in second external heat-exchanger 13 flows into internal heat-exchanger 7 rather than to bypass means 22. Pressure of the refrigerant is, in this instance, similarly detected by sensor 18 in order to stop the operation of compressor 2 and heater means 14 as described above.

In tne cooling mode, four-way valve 3 is set to the cooling position, so that the refrigerant enters external heat-exchanger 4. The refrigerant then flows to inner heat-exchanger 6 through PMV 5 and returns to compressor 2. The cooling operation of air conditioner 1 is quite similar to conventional air conditioners, therefore further explanation is not be needed.

Figure 3:
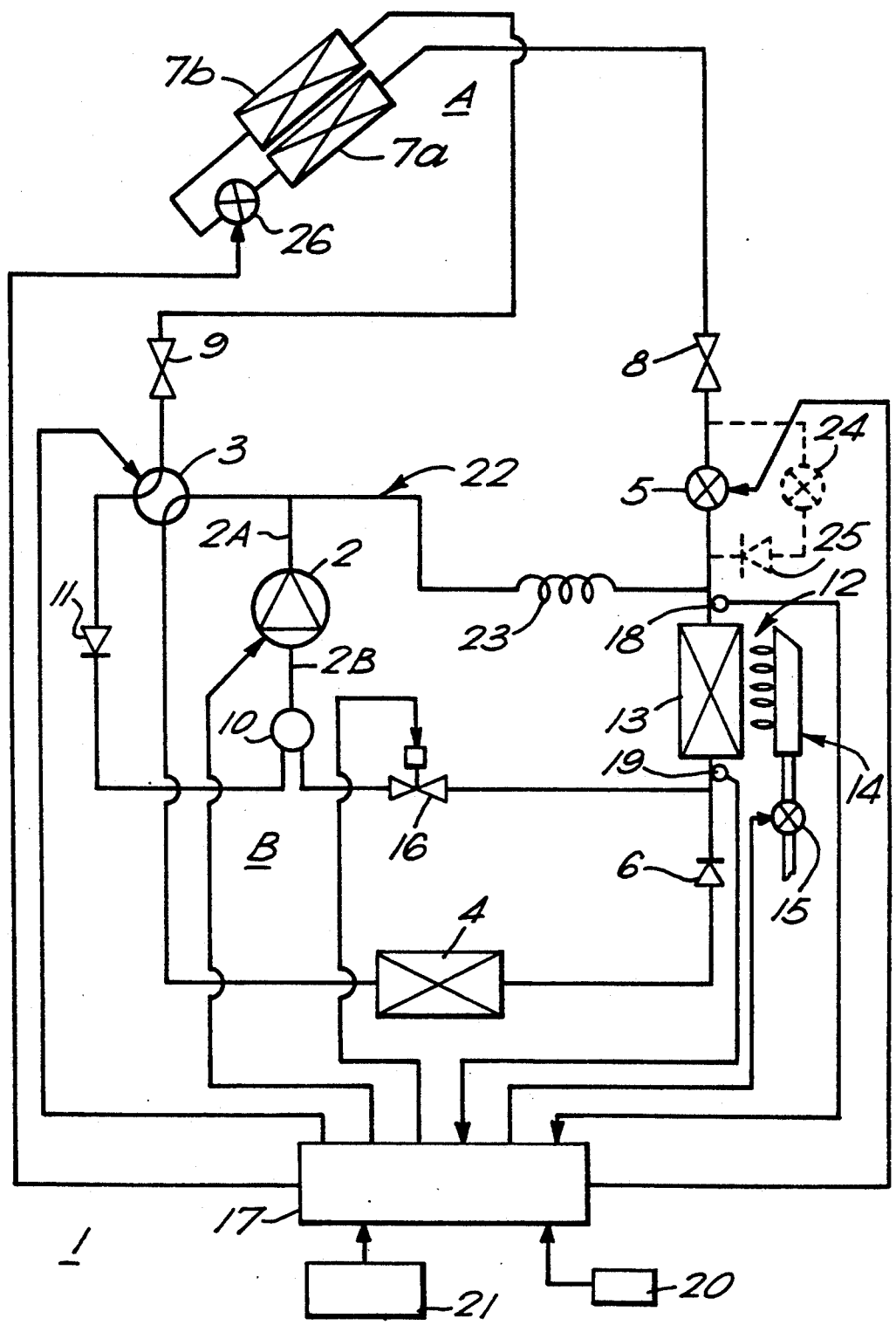
FIG. 3 shows an arrangement of a second embodiment of a refrigerant heating type air conditioner according to the present invention.

A second embodiment of the present invention is shown in FIG. 3 and explained hereunder wherein like reference characters designate identical or oorresponding elements of the above described first embodiment. In this embodiment, refrigerant heating unit 12 is so disposed between PMV 5 and check valve 6 that refrigerant both in the heating mode and in the cooling mode passes through second external heat-exchanger 13. However, second external heat-exchanger 13 in the cooling mode does not serve as either a condenser or an evaporator, other than a flow path, while it serves as an evaporator in the heating mode. Internal unit A has two heat-exchangers 7a and 7b connected in series via an expansion valve 26. Expansion valve 26 is a pulse motor valve (PMV) of which operation is similar to PMV 5, and it is controlled to be fully opened during both the heating mode and the cooling mode. The degree of the opening of PMV 26 is, however, varied to cause first inner heat-exchanger 7a to function as a condenser and to cause second inner heat-exchanger 7b to function as an evaporator when air conditioner 1 works in a dehumidification operation. During the dehumidification operation, PMV 5 is fully opened.

Refrigerant is trapped in second external heat-exchanger 13 by tne failure of two-way valve 16 to open in the heating mode in this embodiment too, however a pressure increase of the trapped refrigerant is mitigated by bypass means 22 in the same manner as ocours in the first embodiment. Furthermore, operations of compressor 2 and heater means 14 are stopped in response to the temperature of the trapped refrigerant detected by sensor 18. Accordingly, any damages to heating unit 12 and other parts such as piping connected to heating unit 12 can also be prevented in this embodiment.

In each of the above embodiments, one end of capillary tube 23 is connected to the connecting point of PMV 5 and one side of second external heat-exchanger 13. However, it may be connected to the other side of second external heat-exchanger 13. In this case, sensor 19 is used for detecting temperature of refrigerant trapped in second external heat-exchanger 13, and compressor 2 and heating means 14 are stopped when temperature thus detected becomes higher than a predetermined value.

The present invention has been described with respect to a specific embodiment. However, other embodiments based on the principles of the present invention should be obvious to those of ordinally skill in the art. Such embodiments are intended to be covered by the claims.

What is claimed is:

1. A refrigerant heating type air conditioner operable in a heating mode, comprising:
an external unit including means for compressing a refrigerant, a refrigerant heating unit including an external heat-exchanger that functions as an evaporator while in said heating mode, and means for heating the refrigerant of said external heat-exchanger while in said heating mode;
an inner unit including an inner heat-exchanger that functions as a condenser while in said heating mode;
distributing means for forming a refrigerant carrying loop, said distributing means including said compressing means, said inner heat-exchanger and said external heat-exchanger, wherein the refrigerant flows through said external heat-exchanger and said inner heat-exchanger while in the heating mode;
refrigerant flow control means, disposed in said distributing means, for controlling the flow of refrigerant, said flow control means including an expansion valve disposed between said inner heat-exchanger and said external heat-exchanger;
bypassing means, disposed between a discharge side of said compressor means and one end of said expansion valve, for releasing the refrigerant in said external heat-exchanger when the pressure of the refrigerant in said external heat-exchanger becomes higher than the pressure of refrigerant discharged from said compressor means while in the heating mode; and
means for controlling th eoperation of said compressor means and said refrigerant flow control means, and for generating a signal to stop an operation of said compressor means when the pressure of refrigerant in said external heat-exchanger exceeds a predetermined pressure.

2. A refrigerant heating type air conditioner operable in a cooling mode and in a heating mode, comprising:
an external unit including means for compressing a refrigerant, a first external heat-exchanger that functions as a condenser while in said cooling mode, a refrigerant heating unit including a second external heat-exchanger that functions as an evaporator while in said heating mode, and means for heating the refrigerant of said second external heat-exchanger while in said heating mode;
an inner unit including a first inner heat-exchanger that functions as an evaporator while in said cooling mode and as a condenser while in said heating mode;
distributing means for forming a refrigerant carrying loop including said compressing means, said first inner heat-exchanger, and said first and second external heat-exchanger, wherein the refrigerant flows through said first inner heat-exchanger and said first external heat-exchanger while in said cooling mode, and flows though said second external heat-exchanger and said first inner heat-exchanger while in said heating mode;
refrigerant flow control means, disposed in said distributing means, for controlling the flow of refrigerant during said heating mode and said cooling mode, said flow control means including a first expansion valve disposed between said first inner heat-exchanger and said first and second external heat-exchanger, along with a control valve coupled to said second external heat-exchanger for preventing refrigerant from flowing to said compressing means through said second external heat-exchanger while in said cooling mode;
bypassing means, disposed between a discharge side of said compressing means and one end of said first expansion valve, for releasing refrigerant in said second external heat-exchanger when the pressure of the refrigerant in said second external heat-exchanger is higher than the pressure of the refrigerant discharged from said compressing means while in said heating mode; and means for controlling the operation of said compressing means and said refrigerant flow control means, and for generating a signal to stop an operation of said compressing means when the pressure of refrigerant in said second heat-exchanger exceeds a predetermined pressure.

3. A refrigerant heating type air conditioner according to claim 2, further comprising detection means for the pressure of the refrigerant in said second external heat-exchange, wherein said detection means is coupled to said operation control means ao that the operation of said compressor is stopped when the detected pressure equals said predetermined pressure.

4. A rerrigerant heating type air conditioner according to claim 3, wherein said detection means includes first temperature sensor means for detecting a temperature of the refrigerant flowing in at least one of an input and an output of said second external heat-exchanger, wherein said operatioh control means stops the operation of said compressing means when said temperature sensor means detects a predetermined temperature corresponding to said predetermined pressure.

5. A refrigerant heating type air conditioner according to claim 4. wherein said distributing means includes a four-way valve for changing the flow of the refrigerant in accordance with said heating mode and cooling mode.

6. A refrigerant heating type air conditioner according to claim 5, wherein said distributing means further includes a second expansion valve and a check valve connected in parallel with said first expansion valve, wherein refrigerant flows through said second expansion valve while in said heating mode.

7. A refrigerant heating type air conditioner according to claim 6, wherein each of said first and second expansion valves are motorized valves coupled to said operation control means.

8. A refrigerant heating type air conditioner according to claim 1, wherein said compressing means includes a variable capacity type of compressor.

9. A refrigerant heating type air conditioner according to claim 2, wherein said inner unit further comprises a second inner heat-exchanger and a second expansion valve, said second expansion valve being coupled to said operation control means and disposed between said first inner heat-exchanger and said second inner heat-exchanger for regulating the flow of the refrigerant so that said second inner heat-exchanger functions as a condenser when said second expansion valve is adjusted to be in said cooling mode by said operation control means so as to perform a dehumidifying operation.

10. A refrigerant heating type air oonditioner according to claim 9, further comprising means for detecting the pressure of the refrigerant in said second external heat-exchange, wherein said detection means is coupled to said operation control means so that the operation of said compressor is stopped when the detected pressure equals said predetermined pressure.

11. A refrigerant heating type air conditioner according to claim 10, wherein said detection means includes first temperature sensor means for detecting a temperature of the refrigerant flowing in at least of of an input and an output of said second external heat-exchanger, wherein said operation control means stops the operation of said compressing means when said first temperature sensor means detects a predetermined temperature corresponding to said predetermined pressure.

12. A refrigerant heating type air conditioner according to claim 11, wherein said distributing means includes a four-way valve for changing the flow of the refrigerant in accordance with said heating mode and cooling mode.

13. A refrigerant heating type air conditioner according to claim 12, wherein said distributing means further includes a second expansion valve and a check valve connected in parallel with said first expansion valve, wherein refrigerant flows through said second expansion valve while in said heating mode.

14. A refrigerant heating type air conditioner according to claim 13, wherein each of said first and second expansion valves are motorized valves coupled to said operation control means.

15. A refrigerant heating type air conditioner according to claim 13, wherein said compressing means includes a variable capacity type of compressor.

* * * * *